June 30, 1970   B. FUTTERER ET AL   3,517,441
SHAVER WITH TWO-FOIL SHEARING HEAD
Filed July 6, 1967   2 Sheets-Sheet 1
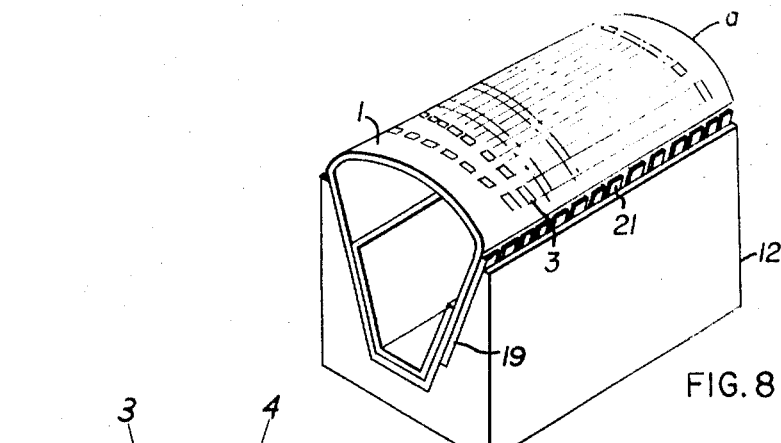
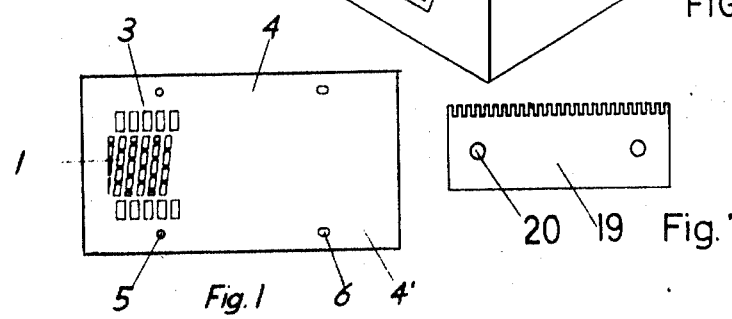
Fig. 1   Fig. 7
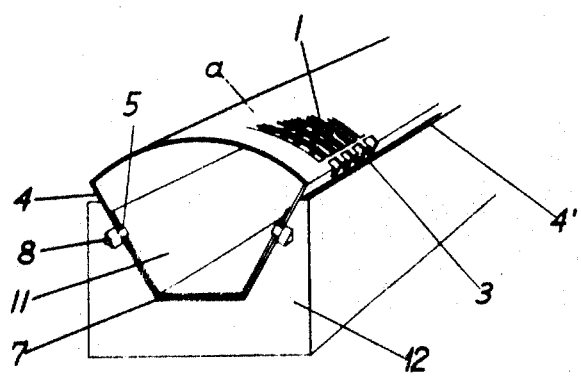
Fig. 2
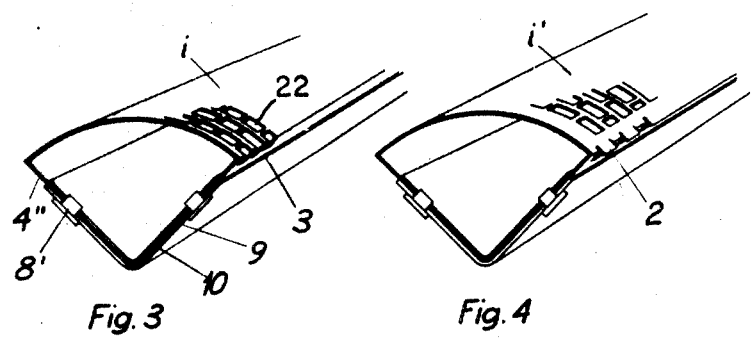
Fig. 3   Fig. 4

United States Patent Office 3,517,441
Patented June 30, 1970

3,517,441
SHAVER WITH TWO-FOIL SHEARING HEAD
Bodo Futterer, Sarnen, and Hugo Fritschy and Klaus Gorlinger, Sachseln, Switzerland, assignors, by mesne assignments, to The Gillette Company, Boston, Mass., a corporation of Delaware
Filed July 6, 1967, Ser. No. 651,492
Claims priority, application Switzerland, July 6, 1966, 9,842/66
Int. Cl. B26b *19/06*
U.S. Cl. 30—34.1                           5 Claims

ABSTRACT OF THE DISCLOSURE

A shaver with a two-foil shearing head, both foils being provided with slots along at least one edge. The inner foil has projecting teeth for intimate contact with the slotted edge portion of the outer foil. A comb-like projection is arranged in front of the slotted edge of the outer foil.

---

The invention relates to a shaver with a two-foil shearing head.

A shaver of this kind with an inner foil and an outer foil is already known, both these foils being provided with cutting openings and having slots for cutting long hairs along at least one edge, the foils being bent angularly in the region of the slots. It has been found that a good cutting action is not obtained with such a shearing head when long hairs are cut, since it is very difficult to design the slots in the region of the angularly bent edge in such manner that close contact of the cutting foils with one another is ensured in this zone.

The problem underlying the invention is to produce a shaver with a two-foil shearing head which also has a good cutting action for long hairs and which is of simple construction.

The solution of this problem is to be seen essentially in that, starting from the known two-foil shearing head, one foil has cutting teeth in the region of the slots and is bent angularly in such manner that the cutting teeth stand clear. In this way, the result is obtained that the cutting teeth can be applied closely against the other foil, so that a good cutting action is always obtained.

A particularly good cutting action for long hairs is obtained if a comb-like member is also arranged in front of that edge of the outer foil which has the slots. It has also been found that the use of such a member reduces irritation of the skin.

Each foil is preferably mounted in an outer shaping holding member and is secured with initial tension by means of a resilient inner holding member which is adapted in shape to the outer holding member. This construction results in simple assembly and facilitates servicing of the appliance.

According to the invention, the foil comprising the cutting teeth can be produced in a particularly simple manner in that this foil is provided with U-shaped cuts in the region of the edges which are to be bent angularly and is then bent angularly in the region of the ends of the side portions of these cuts in such manner that those zones which are bounded by the cuts and form the cutting teeth are not bent over at the same time.

The U-shaped cuts are preferably already produced during the making of the foil by electrodeposition.

An embodiment of the invention is described supplementarily hereinafter with references to diagrammatic drawings, in which:

FIG. 1 is a plan view of a foil with various shaving zones;

FIG. 2 is a perspective view of the outer foil with a U-shaped holding member;

FIG. 3 is a perspective view of the inner foil with a V-shaped holding member and which is bent angularly in the long-hair zone;

FIG. 4 shows a modification of the arrangement according to FIG. 3, but with teeth exposed in accordance with the invention;

FIG. 7 shows a comb-like member which is arranged along one edge of the outer foil in a modification according to the invention; and FIG. 8 is a perspective view showing the comb in assembled position.

Figure 5:
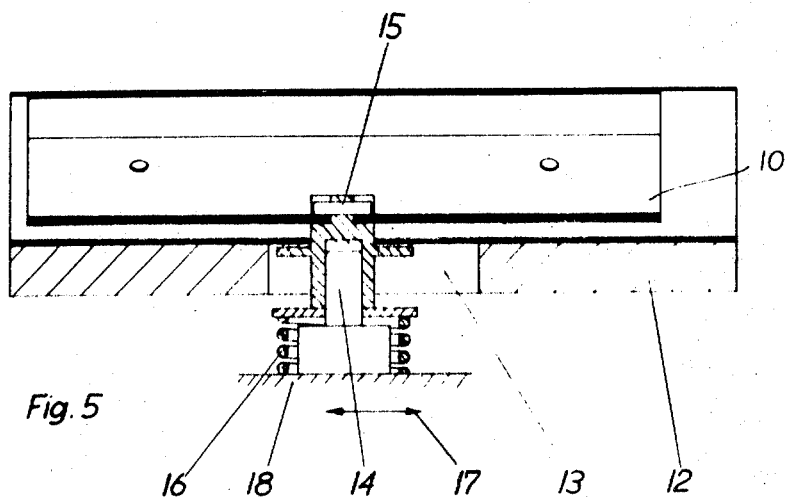
FIG. 5 is a longitudinal section through the shearing head according to FIGS. 2 and 4 in the assembled state.

FIG. 1 shows diagrammatically a shearing foil in the flat state. The reference 1 designates perforations in the short-hair zone. The reference 3 designates slots arranged along the short-hair zone, these forming shaving zones for long hairs when the marginal portions 4 and 4' of the foil are bent angularly at the bending edges. This long-hair zone can be seen clearly in the perspective view of FIG. 2, in which, as in all drawings, the same parts have the same reference symbols. The holes 5 and 6 serve to fix the foil in a holding member. This holding member is shown in perspective in FIG. 2 for an outer foil $a$ and is designated by the reference 12. The holding member carries studs or screws 8 on which the foil is centered by means of holes 5 and 6 and is held with initial tension by means of the resilient inner holding member 7 which is adapted in shape to the outer holding member 12.

FIG. 3 is a perspective view of the inner foil $i$, the angularly bent marginal portion of which is designated by 4" and is held by means of studs or screws 8' between two V-shaped holding members 9 and 10. The openings in the inner foil are shown at 22. FIG. 4 shows an arrangement corresponding to that shown in FIG. 3, with the difference that according to the invention the inner foil in this constructional form has exposed teeth 2 at the bending edge.

The inner foils $i$ and $i'$ are inserted with their holding members 9, 10 into the inner space 11 formed by the outer foil $a$ and its holding member 7.

Figure 6:
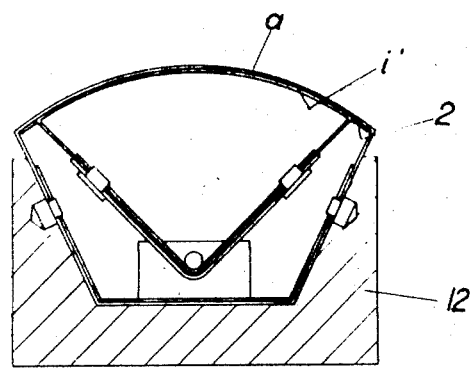
FIG. 6 is a cross-section through the shearing head according to FIG. 5.

The shearing head is shown in FIGS. 5 and 6 in the assembled state, in longitudinal section in FIG. 5 and in cross section in FIG. 6. The reference symbols are the same as in FIGS. 1 to 4. It can be seen in FIG. 5 that the holder 12 has an opening 13 through which there projects a driving pin 14 which is attached to the holding member 10 of the inner foil by means of a securing device 15. The driving pin 14 is arranged in a spring 16 shown as a coil spring in the embodiment, whereby the inner foil is given the necessary contact pressure against the outer foil and it is ensured that the two foils conform closely to one another. The driving pin 14 is arranged on a part 18 which can be reciprocated periodically in the direction of the arrow 17 and which may be a translatorily movable intermediate member connected to the driving motor or be directly a motor with a reciprocating action.

FIG. 7 shows a comb-like member 19 which is so arranged along one edge 4 or 4' of the outer foil $a$ that the gaps between the teeth 21 coincide with the slots 3 in the outer foil. Holes 20 with the aid of which the comb-like member is held between the outer holding member 12 and the angularly bent zone 4 or 4' of the outer foil by means of studs or screws 8 serve to secure the said comb-like member.

FIG. 8 shows the comb-like member 19 with teeth 21 in place between the holding member 12 and angularly bent zone 4 or 4' of the outer foil.

What is claimed is:
1. A shaver with a two-foil shearing head comprising:
   (a) an inner foil,
   (b) an outer foil,
   (c) said outer foil having a plurality of small cutting openings and a plurality of larger cutting openings,
   (d) said inner foil having a plurality of cutting openings and a plurality of cutting teeth,
   (e) said inner foil being angularly bent in the region of said cutting teeth, such that said cutting teeth project from said inner foil,
   (f) said inner foil cutting openings cooperating with said small cutting openings of said outer foil for cutting short hairs,
   (g) said cutting teeth cooperating with said larger cutting openings for cutting long hairs,
   (h) said outer foil having an angular bend in the region of said larger cutting openings.
2. A shaver as set forth in claim 1 wherein,
   (a) said larger cutting openings extend around said angular bend.
3. A shaver as set forth in claim 1 further comprising combing means adjacent said cutting slots of said outer foil.
4. A shaver as set forth in claim 3 wherein,
   (a) said combing means includes teeth having gaps therebetween,
   (b) said gaps are adjacent said cutting slots in said outer foil.
5. A shaver as set forth in claim 1 further comprising:
   (a) outer foil holding means,
   (b) inner foil holding means,
   (c) said inner and outer foils being mounted in said outer foil holding means,
   (d) said inner foil holding means comprising:
      (1) a pair of V-shaped holding members,
      (2) said inner foil being held between said pair of V-shaped holding members,
   (e) said outer foil holding means comprising a U-shaped holding member.

References Cited

UNITED STATES PATENTS

| 2,141,582 | 12/1938 | Wimberger | 30—34.1 |
| 2,948,063 | 8/1960 | Jepson | 30—34.1 |
| 3,060,569 | 10/1962 | Oliver et al. | 30—34.1 |
| 3,201,178 | 8/1965 | Okubo | 30—34.1 |

FOREIGN PATENTS

| 1,114,117 | 9/1961 | Germany. |
| 194,520 | 6/1938 | Switzerland. |

LESTER M. SWINGLE, Primary Examiner

J. C. PETERS, Assistant Examiner